(12) United States Patent
Wang et al.

(10) Patent No.: US 12,284,165 B2
(45) Date of Patent: Apr. 22, 2025

(54) DATA PRIVACY PROTECTION METHOD BASED ON MULTI-LAYER ENCRYPTION

(71) Applicant: Hangzhou Hikvision Digital Technology Co., Ltd., Zhejiang (CN)

(72) Inventors: Bin Wang, Zhejiang (CN); Si Chen, Zhejiang (CN); Kezhang Lin, Zhejiang (CN); Yulong Shen, Zhejiang (CN); Zhiwei Zhang, Zhejiang (CN); Guoyun Wang, Zhejiang (CN); Jiadong Chen, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/730,878

(22) PCT Filed: Oct. 17, 2023

(86) PCT No.: PCT/CN2023/125022
§ 371 (c)(1),
(2) Date: Jul. 22, 2024

(87) PCT Pub. No.: WO2024/088115
PCT Pub. Date: May 2, 2024

(65) Prior Publication Data
US 2024/0422142 A1 Dec. 19, 2024

(30) Foreign Application Priority Data
Oct. 28, 2022 (CN) .......................... 202211330632.5

(51) Int. Cl.
*H04L 9/40* (2022.01)
*H04L 9/30* (2006.01)
(52) U.S. Cl.
CPC ............ *H04L 63/0471* (2013.01); *H04L 9/30* (2013.01); *H04L 63/0478* (2013.01)

(58) Field of Classification Search
CPC .... H04L 63/0471; H04L 9/30; H04L 63/0478
See application file for complete search history.

(56) References Cited

U.S. PATENT DOCUMENTS

| 11,265,300 | B1 * | 3/2022 | Mahdavi ............... H04L 9/0819 |
| 2003/0182443 | A1 | 9/2003 | Wang et al. |

(Continued)

FOREIGN PATENT DOCUMENTS

| CN | 102484638 A | 5/2012 |
| CN | 106254069 A | 12/2016 |

(Continued)

OTHER PUBLICATIONS

Bezzateev et al., "Multi-Layer Message Signature Scheme with Threshold-based Distributed PKG and Dynamic Leader Selection", Nov. 2021, Third International Conference on Blockchain Computing and Applications, pp. 151-155 (Year: 2021).*

*Primary Examiner* — Kenneth W Chang
(74) *Attorney, Agent, or Firm* — Bret E. Field; Bozicevic, Field & Francis LLP

(57) ABSTRACT

A data privacy protection method based on multi-layer encryption is disclosed, which is related to the technical field of network technologies. The method includes: by an initial client, encrypting service data based on a public key set to obtain first to-be-processed data, and sending the first to-be-processed data to a next client; by an intermediate client, obtaining the first to-be-processed data sent by a previous client, encrypting service data based on a public key set to obtain second encrypted data, and sending second to-be-processed data and the second encrypted data to a next client; by a final client, obtaining the second to-be-processed data and the second encrypted data sent by a previous client, decrypting the second to-be-processed data and the second encrypted data based on its own private key, to obtain service data of each of other clients other than the final client (Continued)

itself, and sending the service data of all of the clients in a data privacy protection system to a preset service platform. The embodiments of the present application are applied to reduce the risk of user's privacy data leakage.

20 Claims, 5 Drawing Sheets

(56) References Cited

U.S. PATENT DOCUMENTS

| | | | | |
|---|---|---|---|---|
| 2007/0140479 | A1* | 6/2007 | Wang | H04L 9/30 380/30 |
| 2011/0252243 | A1* | 10/2011 | Brouwer | G06F 21/62 713/189 |
| 2012/0173887 | A1* | 7/2012 | Dodd | H04L 9/0891 713/193 |
| 2015/0095658 | A1* | 4/2015 | Spalka | G06F 21/6245 713/190 |
| 2015/0237019 | A1* | 8/2015 | Rohloff | H04L 63/06 713/171 |
| 2015/0256336 | A1* | 9/2015 | Stiglic | H04L 9/0863 380/281 |
| 2017/0012974 | A1* | 1/2017 | Sierra | H04W 12/08 |
| 2017/0357822 | A1* | 12/2017 | Wei | H04L 9/30 |
| 2017/0359331 | A1* | 12/2017 | Bonnet | H04L 9/0836 |
| 2023/0182443 | A1 | 6/2023 | Lee et al. | |

FOREIGN PATENT DOCUMENTS

| | | |
|---|---|---|
| CN | 107483505 A | 12/2017 |
| CN | 112235107 A | 1/2021 |
| CN | 112953978 A | 6/2021 |
| CN | 115412365 A | 11/2022 |

* cited by examiner

DATA PRIVACY PROTECTION METHOD BASED ON MULTI-LAYER ENCRYPTION

The present application claims the priority to a Chinese patent application No. 202211330632.5 filed with the China National Intellectual Property Administration on Oct. 28, 2022 and entitled "DATA PRIVACY PROTECTION METHOD BASED ON MULTI-LAYER ENCRYPTION", which is incorporated herein by reference in its entirety.

TECHNICAL FIELD

The application relates to the field of network technology, particularly to a data privacy protection method based on multi-layer encryption.

BACKGROUND

With the rapid development of network technology, a user can log in to a service platform through a client and sends his/her service data to the service platform through the client. For example, the user can upload his/her service data to a smart healthcare service platform through the client, and the uploaded service data includes user's physical condition information.

In addition, in related technologies, the service platform needs to authenticate the user's real identity, that is, the service platform can obtain user's identity data. Furthermore, when the user sends his/her service data to the service platform through the client, the service platform can associate user's identity data with user's service data, which increases the risk of user's privacy data leakage.

SUMMARY

An object of embodiments of the present application is to provide a data privacy protection method based on multi-layer encryption to reduce the risk of user's privacy data leakage. The specific technical solutions are as follows.

In a first aspect of the embodiment of the present application, a data privacy protection method based on multi-layer encryption is provided, which is applied to an intermediate client of multiple clients included in a data privacy protection system; wherein the multiple clients are in a specified order, and the intermediate client is any client other than a first client and a last client in the specified order, the method includes:

obtaining first to-be-processed data sent by a previous client of the intermediate client in the specified order, wherein the first to-be-processed data includes first encrypted data obtained by the previous client of the intermediate client encrypting the previous client's own service data based on a public key set corresponding to the previous client itself, and first to-be-forwarded data which is obtained based on data received by the previous client of the intermediate client from another client; and wherein a public key set corresponding to a client includes a public key of the last client;

encrypting the intermediate client's own service data based on a public key set corresponding to the intermediate client itself, to obtain second encrypted data;

sending second to-be-processed data and the second encrypted data to a next client of the intermediate client in the specified order, so that the last client decrypts, after receiving the data, the received data based on its own private key to obtain service data of each of other clients other than the last client itself, and sends the service data of each of other clients other than the last client itself and the last client's own service data to a preset service platform; wherein the second to-be-processed data is obtained based on the first to-be-processed data.

In one optional embodiment, the public key set corresponding to a client further includes a public key of a client located between the client and the last client in the specified order;

the first encrypted data is obtained by the previous client of the intermediate client iteratively encrypting the previous client's own service data layer by layer based on public keys in the public key set corresponding to the previous client itself, in an encryption order corresponding to the public keys; wherein the encryption order is opposite to a specified order for clients corresponding to the public keys;

the first to-be-forwarded data is obtained by the previous client of the intermediate client decrypting the data sent by another client based on the previous client's own private key;

before sending the second to-be-processed data and the second encrypted data to the next client of the intermediate client in the specified order, the method further includes:

decrypting the first to-be-processed data based on the intermediate client's own private key, to obtain the second to-be-processed data;

encrypting the intermediate client's own service data based on the public key set corresponding to the intermediate client itself, to obtain the second encrypted data, includes:

iteratively encrypting the intermediate client's own service data layer by layer in the encryption order based on public keys in the public key set corresponding to the intermediate client itself, to obtain the second encrypted data.

In one optional embodiment, iteratively encrypting the intermediate client's own service data layer by layer in the encryption order based on the public keys in the public key set corresponding to the intermediate client itself, to obtain the second encrypted data, includes:

obtaining the intermediate client's own service data as current to-be-encrypted data, and determining the last client as a current candidate client;

encrypting the current to-be-encrypted data based on a public key of the current candidate client, to obtain current intermediate encrypted data;

in the specified order, taking a previous client of the current candidate client as the current candidate client and taking the current intermediate encrypted data as the current to-be-encrypted data, and returning to perform an operation of encrypting the current to-be-encrypted data based on the public key of the current candidate client to obtain the current intermediate encrypted data, until the current to-be-encrypted data is encrypted based on a public key of a next client of the intermediate client in the specified order to obtain the current intermediate encrypted data as the second encrypted data.

In one optional embodiment, after sending the second to-be-processed data and the second encrypted data to the next client of the intermediate client in the specified order, the method further includes:

obtaining response data sent by the last client; wherein, the response data includes service data of each of the multiple clients and a response result corresponding to the service data of each of the multiple clients, and the response data is sent by the preset service platform to the last client;

determining a response result corresponding to the intermediate client's own service data from the response data.

In one optional embodiment, before obtaining the first to-be-processed data sent by the previous client of the intermediate client in the specified order, the method further includes:

generating the intermediate client's own public and private keys, and sending the intermediate client's own public key to a client in the data privacy protection system that is located before the intermediate client in the specified order.

In a second aspect of the embodiment of the present application, a data privacy protection method based on multi-layer encryption is further provided, which is applied to an initial client of multiple clients included in a data privacy protection system; wherein the multiple clients are in a specified order, and the initial client is a first client in the specified order, the method includes:

encrypting the initial client's own service data based on a public key set corresponding to the initial client itself, to obtain first to-be-processed data; wherein a public key set corresponding to a client includes a public key of a last client in the specified order;

sending the first to-be-processed data to a next client of the initial client in the specified order, so that the next client of the initial client in the specified order obtains second to-be-forwarded data based on the first to-be-processed data, encrypts the next client's own service data based on the public key set corresponding to the next client itself to obtain second encrypted data, and sends the second to-be-forwarded data and the second encrypted data to a next client of the next client itself, such that the last client decrypts, after receiving the data, the received data based on its own private key to obtain service data of each of other clients other than the last client itself, and sends the service data of each of other clients other than the last client itself and the last client's own service data to a preset service platform.

In one optional embodiment, the public key set corresponding to a client further includes a public key of a client located between the client and the last client in the specified order;

the second to-be-forwarded data is obtained by the next client of the initial client decrypting the first to-be-processed data based on the next client's own private key;

encrypting the initial client's own service data based on the public key set corresponding to the initial client itself, to obtain the first to-be-processed data, includes:

iteratively encrypting the initial client's own service data layer by layer in an encryption order based on public keys in the public key set corresponding to the initial client itself, to obtain the first to-be-processed data, wherein the encryption order is opposite to a specified order for clients corresponding to the public keys.

In one optional embodiment, iteratively encrypting the initial client's own service data layer by layer in the encryption order based on the public keys in the public key set corresponding to the initial client itself, to obtain the first to-be-processed data, includes:

obtaining the initial client's own service data as current to-be-encrypted data, and determining the last client as a current candidate client;

encrypting the current to-be-encrypted data based on a public key of the current candidate client, to obtain current intermediate encrypted data;

in the specified order, taking a previous client of the current candidate client as the current candidate client, and taking the current intermediate encrypted data as the current to-be-encrypted data, and returning to perform an operation of encrypting the current to-be-encrypted data based on the public key of the current candidate client to obtain the current intermediate encrypted data, until the current to-be-encrypted data is encrypted based on a public key of a next client of the initial client in the specified order to obtain the current intermediate encrypted data as the first to-be-processed data.

In one optional embodiment, after sending the first to-be-processed data to the next client of the initial client in the specified order, the method further includes:

obtaining response data sent by the last client; wherein, the response data includes service data of each of the multiple clients and a response result corresponding to the service data of each of the multiple clients, and the response data is sent by the preset service platform to the last client;

determining a response result corresponding to the initial client's own service data from the response data.

In a third aspect of the embodiment of the present application, a data privacy protection method based on multi-layer encryption is further provided, which is applied to a final client of multiple clients included in a data privacy protection system; wherein the multiple clients are in a specified order, and the final client is a last client in the specified order, the method includes:

obtaining second to-be-processed data and second encrypted data sent by a previous client of the final client in the specified order, wherein the second to-be-processed data is obtained based on first to-be-processed data received by the previous client of the final client from another client; the second encrypted data is obtained by the previous client of the final client encrypting the previous client's own service data based on a public key set corresponding to the previous client itself; a public key set corresponding to a client includes a public key of the final client;

decrypting the second to-be-processed data and the second encrypted data based on the final client's own private key, to obtain service data of each of other clients other than the final client itself;

sending the service data of each of other clients other than the final client itself and the final client's own service data to a preset service platform.

In one optional embodiment, the public key set corresponding to a client further includes a public key of a client located between the client and the final client in the specified order;

the second to-be-processed data is obtained by the previous client of the final client decrypting the first to-be-processed data sent by another client based on the previous client's own private key;

the second encrypted data is obtained by the previous client of the final client iteratively encrypting the previous client's own service data layer by layer in an encryption order based on a public key set corresponding to the previous client itself; wherein the encryption order is opposite to a specified order for clients corresponding to public keys.

In one optional embodiment, sending the service data of each of other clients other than the final client itself and the final client's own service data to the preset service platform, includes:

encrypting the service data of each of other clients other than the final client itself and the final client's own service data based on a preset key, to obtain third encrypted data;

sending the third encrypted data to the preset service platform.

In one optional embodiment, after sending the service data of each of other clients other than the final client itself and the final client's own service data to the preset service platform, the method further includes:

obtaining response data sent by the preset service platform; wherein the response data includes service data of each of the multiple clients and a response result corresponding to the service data of each of the multiple clients;

sending the response data to other clients in the data privacy protection system.

In one optional embodiment, before obtaining the second to-be-processed data and the second encrypted data sent by the previous client of the final client in the specified order, the method further includes:

generating the final client's own public and private keys, and sending the final client's own public key to other clients in the data privacy protection system In a fourth aspect of the embodiment of the present application, a data privacy protection system is further provided, which includes multiple clients; the multiple clients are in a specified order, wherein:

an intermediate client is configured for carrying out any of the methods described in the first aspect above; the intermediate client is any client of the multiple clients other than the first client and the last client in the specified order;

an initial client is configured for carrying out any of the methods described in the second aspect above; the initial client is the first client of the multiple clients in the specified order;

a final client is configured for carrying out any of the methods described in the third aspect above; the final client is the last client of the multiple clients in the specified order.

In a fifth aspect of the embodiment of the present application, a data privacy protection apparatus based on multi-layer encryption is provided, which is applied to an intermediate client of multiple clients included in a data privacy protection system; wherein the multiple clients are in a specified order, and the intermediate client is any client other than a first client and a last client in the specified order, the apparatus includes:

a first obtaining module, configured for obtaining first to-be-processed data sent by a previous client of the intermediate client in the specified order, wherein the first to-be-processed data includes first encrypted data obtained by the previous client of the intermediate client encrypting the previous client's own service data based on a public key set corresponding to the previous client itself, and first to-be-forwarded data which is obtained based on data received by the previous client of the intermediate client from another client; and wherein a public key set corresponding to a client includes a public key of the last client;

a first encrypting module, configured for encrypting the intermediate client's own service data based on the public key set corresponding to the intermediate client itself, to obtain second encrypted data;

a first sending module, configured for sending second to-be-processed data and the second encrypted data to a next client of the intermediate client in the specified order, so that the last client decrypts, after receiving the data, the received data based on its own private key to obtain service data of each of other clients other than the last client itself, and sends the service data of each of other clients other than the last client itself and the last client's own service data to a preset service platform; wherein the second to-be-processed data is obtained based on the first to-be-processed data.

In one optional embodiment, the public key set corresponding to a client further includes a public key of a client located between the client and the last client in the specified order;

the first encrypted data is obtained by the previous client of the intermediate client iteratively encrypting the previous client's own service data layer by layer based on public keys in the public key set corresponding to the previous client itself, in an encryption order corresponding to the public keys; wherein the encryption order is opposite to a specified order for clients corresponding to the public keys;

the first to-be-forwarded data is obtained by the previous client of the intermediate client decrypting the data sent by another client based on the previous client's own private key;

the apparatus further includes:

a first decrypting module, configured for: before sending the second to-be-processed data and the second encrypted data to the next client of the intermediate client in the specified order, decrypting the first to-be-processed data based on the intermediate client's own private key to obtain the second to-be-processed data;

the first encrypting module is specifically configured for iteratively encrypting the intermediate client's own service data layer by layer in the encryption order based on public keys in the public key set corresponding to the intermediate client itself, to obtain the second encrypted data.

In one optional embodiment, the first encrypting module includes:

a first pre-processing sub-module, configured for obtaining the intermediate client's own service data as current to-be-encrypted data, and determining the last client as a current candidate client;

a first intermediate encrypting sub-module, configured for encrypting the current to-be-encrypted data based on a public key of the current candidate client, to obtain current intermediate encrypted data;

a first processing sub-module, configured for: in the specified order, taking a previous client of the current candidate client as the current candidate client and taking the current intermediate encrypted data as the current to-be-encrypted data, and returning to perform an operation of encrypting the current to-be-encrypted data based on the public key of the current candidate client to obtain the current intermediate encrypted data, until the current to-be-encrypted data is encrypted based on a public key of a next client of the intermediate client in the specified order to obtain the current intermediate encrypted data as the second encrypted data.

In one optional embodiment, the apparatus further includes:
a second obtaining module, configured for: after sending the second to-be-processed data and the second encrypted data to the next client of the intermediate client in the specified order, obtaining response data sent by the last client; wherein, the response data includes service data of each of the multiple clients and a response result corresponding to the service data of each of the multiple clients, and the response data is sent by the preset service platform to the last client;
a first response result determining module, configured for determining a response result corresponding to the intermediate client's own service data from the response data.

In one optional embodiment, the apparatus further includes:
a first generating module, configured for: before obtaining the first to-be-processed data sent by the previous client of the intermediate client in the specified order, generating the intermediate client's own public and private keys, and sending the intermediate client's own public key to a client in the data privacy protection system that is located before the intermediate client in the specified order.

In a sixth aspect of the embodiment of the present application, a data privacy protection apparatus based on multi-layer encryption is further provided, which is applied to an initial client of multiple clients included in a data privacy protection system; wherein the multiple clients are in a specified order, and the initial client is a first client in the specified order, the apparatus includes:
a second encrypting module, configured for encrypting the initial client's own service data based on a public key set corresponding to the initial client itself, to obtain first to-be-processed data; wherein a public key set corresponding to a client includes a public key of a last client in the specified order;
a second sending module, configured for sending the first to-be-processed data to a next client of the initial client in the specified order, so that the next client of the initial client in the specified order obtains second to-be-forwarded data based on the first to-be-processed data, encrypts the next client's own service data based on the public key set corresponding to the next client itself to obtain second encrypted data, and sends the second to-be-forwarded data and the second encrypted data to a next client of the next client itself, such that the last client decrypts, after receiving the data, the received data based on its own private key to obtain service data of each of other clients other than the last client itself, and sends the service data of each of other clients other than the last client itself and the last client's own service data to a preset service platform.

In one optional embodiment, the public key set corresponding to a client further includes a public key of a client located between the client and the last client in the specified order;
the second to-be-forwarded data is obtained by the next client of the initial client decrypting the first to-be-processed data based on the next client's own private key;
the second encrypting module is specifically configured for iteratively encrypting the initial client's own service data layer by layer in an encryption order based on public keys in the public key set corresponding to the initial client itself, to obtain the first to-be-processed data, wherein the encryption order is opposite to a specified order for clients corresponding to the public keys.

In one optional embodiment, the second encrypting module includes:
a second pre-processing sub-module, configured for obtaining the initial client's own service data as current to-be-encrypted data, and determining the last client as a current candidate client;
a second intermediate encrypting sub-module, configured for encrypting the current to-be-encrypted data based on a public key of the current candidate client, to obtain current intermediate encrypted data;
a second processing sub-module, configured for: in the specified order, taking a previous client of the current candidate client as the current candidate client, and taking the current intermediate encrypted data as the current to-be-encrypted data, and returning to perform an operation of encrypting the current to-be-encrypted data based on the public key of the current candidate client to obtain the current intermediate encrypted data, until the current to-be-encrypted data is encrypted based on a public key of a next client of the initial client in the specified order to obtain the current intermediate encrypted data as the first to-be-processed data.

In one optional embodiment, the apparatus further includes:
a third obtaining module, configured for, after sending the first to-be-processed data to the next client of the initial client in the specified order, obtaining response data sent by the last client; wherein, the response data includes service data of each of the multiple clients and a response result corresponding to the service data of each of the multiple clients, and the response data is sent by the preset service platform to the last client;
a second response result determining module, configured for determining a response result corresponding to the initial client's own service data from the response data.

In a seventh aspect of the embodiment of the present application, a data privacy protection apparatus based on multi-layer encryption is further provided, which is applied to a final client of multiple clients included in a data privacy protection system; wherein the multiple clients are in a specified order, and the final client is a last client in the specified order, the apparatus includes:
a fourth obtaining module, configured for obtaining second to-be-processed data and second encrypted data sent by a previous client of the final client in the specified order, wherein the second to-be-processed data is obtained based on first to-be-processed data received by the previous client of the final client from another client; the second encrypted data is obtained by the previous client of the final client encrypting the previous client's own service data based on a public key set corresponding to the previous client itself; a public key set corresponding to a client includes a public key of the final client;
a second decrypting module, configured for decrypting the second to-be-processed data and the second encrypted data based on the final client's own private key, to obtain service data of each of other clients other than the final client itself;

a third sending module, configured for sending the service data of each of other clients other than the final client itself and the final client's own service data to a preset service platform.

In one optional embodiment, the public key set corresponding to a client further includes a public key of a client located between the client and the final client in the specified order;

the second to-be-processed data is obtained by the previous client of the final client decrypting the first to-be-processed data sent by another client based on the previous client's own private key;

the second encrypted data is obtained by the previous client of the final client iteratively encrypting the previous client's own service data layer by layer in an encryption order based on a public key set corresponding to the previous client itself; wherein the encryption order is opposite to a specified order for clients corresponding to public keys.

In one optional embodiment, the third sending module includes:

a third encrypting sub-module, configured for encrypting the service data of each of other clients other than the final client itself and the final client's own service data based on a preset key, to obtain third encrypted data;

a fourth encrypting sub-module, configured for sending the third encrypted data to the preset service platform.

In one optional embodiment, the apparatus further includes:

a fifth obtaining module, configured for, after sending the service data of each of other clients other than the final client itself and the final client's own service data to the preset service platform, obtaining response data sent by the preset service platform; wherein the response data includes service data of each of the multiple clients and a response result corresponding to the service data of each of the multiple clients;

a fifth sending module, configured for sending the response data to other clients in the data privacy protection system.

In one optional embodiment, the apparatus further includes:

a second generating module, configured for, before obtaining the second to-be-processed data and the second encrypted data sent by the previous client of the final client in the specified order, generating the final client's own public and private keys, and sending the final client's own public key to other clients in the data privacy protection system.

In an eighth aspect of the embodiment of the present application, an electronic device is provided, including:

a memory, configured for storing a computer program;

a processor, configured for carry out any of the above data privacy protection methods based on multi-layer encryption when executing the program stored in the memory.

In a ninth aspect of the embodiment of the present application, a non-temporary computer-readable storage medium is further provided, which has a computer program storing thereon, that when executed by the processor, carries out any of the above data privacy protection methods based on multi-layer encryption.

In a tenth aspect of the embodiment of the present application, a computer program containing instructions is further provided, which, when running on a computer, cause the computer to carry out any of the above data privacy protection methods based on multi-layer encryption.

The beneficial effects of the embodiments of the present application are as follows:

the embodiment of the present application provides a data privacy protection method based on multi-layer encryption, in which an initial client encrypts its own service data based on a public key set corresponding to the initial client itself to obtain first to-be-processed data, wherein a public key set corresponding to a client includes a public key of a final client; and sends the first to-be-processed data to a next client of the initial client in a specified order; an intermediate client obtains the first to-be-processed data sent by the previous client of the intermediate client in the specified order, wherein the first to-be-processed data includes first encrypted data obtained by the previous client of the intermediate client encrypting the previous client's own service data based on a public key set corresponding to the previous client itself, and first to-be-forwarded data which is obtained based on data received by the previous client of the intermediate client from another client; encrypts the intermediate client's own service data based on a public key set corresponding to the intermediate client itself, to obtain second encrypted data; sends second to-be-processed data and the second encrypted data to a next client of the intermediate client in the specified order; a final client obtains the second to-be-processed data and the second encrypted data sent by a previous client of the final client in the specified order, wherein the second to-be-processed data is obtained based on first to-be-processed data received by the previous client of the final client from another client, and the second encrypted data is obtained by the previous client of the final client encrypting the previous client's own service data based on a public key set corresponding to the previous client itself; decrypts the second to-be-processed data and the second encrypted data based on the final client's own private key, to obtain service data of each of other clients other than the final client itself; sends the service data of each of other clients other than the final client itself and the final client's own service data to a preset service platform.

Based on the above processing, the last client is responsible for sending the service data of each client to the preset service platform, and other clients do not need to send service data to the preset service platform, so that the preset service platform cannot distinguish the multiple pieces of service data to determine a client to which each piece of service data belongs, and cannot associate user's identity data with user's service data, thereby reducing the risk of user's privacy data leakage. In addition, each client sends, to the next client in a specified sorting order, encrypted service data and the to-be-forwarded data obtained based on the data sent by the previous client. That is to say, for each client other than the initial client and the first intermediate client in the specified order, the client can receive multiple pieces of service data from the previous client. However, the client cannot distinguish the multiple pieces of service data to determine the client to which each piece of service data belongs. The first intermediate client in the specified order has not obtained a private key of the last client, and thus cannot decrypt the encrypted service data sent by the initial client, that is, cannot determine the service data of the initial client. That is to say, each client other than the initial client in the specified order is unable to associate the user's identity data with the user's service data, which can further reduce the risk of the user's privacy data leakage.

Of course, it is not necessary for any product or method implementing the present application to achieve all the advantages mentioned above simultaneously.

BRIEF DESCRIPTION OF THE DRAWINGS

The accompanying drawings described here are intended to provide a further understanding of the present application and constitute a part of the same. The illustrative embodiments and their explanations of the present application are used to explain the present application and do not constitute an improper limitation of the present application.

DETAILED DESCRIPTION

In order to make the purpose, technical solutions, and advantages of the present application clearer and more understandable, the present application will be described in more detail below with reference to the accompanying drawings and embodiments. Obviously, the described embodiments are only some, and not all, of the embodiments of the present application. All other embodiments obtained based on the embodiments of the present application by those skilled in the art fall into the scope of protection of the present application.

In related technologies, a user can log in to a service platform through a client and sends his/her service data to the service platform through the client. The service platform needs to authenticate the use's real identity, that is, the service platform can obtain user's identity data. Furthermore, when the user sends his/her service data to the service platform through the client, the service platform can associate the user's identity data with the user's service data, which increases the risk of user's privacy data leakage.

For example, the service platform can be a smart healthcare service platform. Correspondingly, the user's service data can be user's physical condition information, such as a user's medical record; the user's identity data can be the user's real identity information, such as the user's resident ID card number. When the user upload his/her medical record to the smart healthcare service platform through the client, the smart healthcare service platform can associate the user's real identity information with the user's medical record, thereby leading to the user's privacy data leakage.

Figure 1:
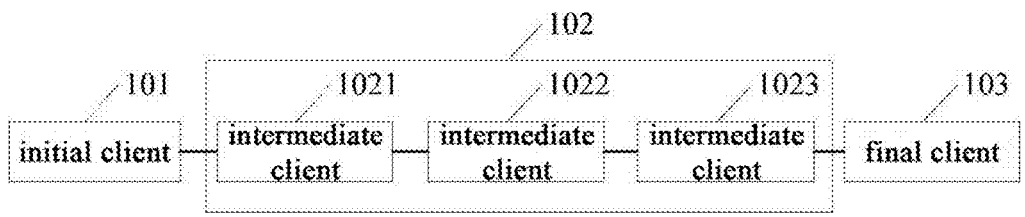
FIG. 1 is an architecture diagram of a data privacy protection system provided by an embodiment of the present application.

In order to solve the above problems, an embodiment of the present application provides a data privacy protection system. Taking an architecture of the data privacy protection system shown in FIG. 1 as an example, FIG. 1 is an architecture diagram of a data privacy protection system provided by an embodiment of the present application. The data privacy protection system includes multiple clients which are in a specified order, where an initial client 101 is a first client, a final client 103 is a last client, and the data privacy protection system also includes intermediate clients 102 (including an intermediate client 1021, an intermediate client 1022, and an intermediate client 1023). The embodiment is illustrated only by the example of including three intermediate clients, and is not limited to this in actual scenarios. Wherein, the initial client 101 is configured for encrypting its own service data based on a public key set corresponding to the initial client itself, to obtain first to-be-processed data; and for sending the first to-be-processed data to a next client of the initial client 101 in the specified order; wherein, the public key set corresponding to a client includes: a public key of the final client 103;

each of the intermediate clients 102 is configured for obtaining the first to-be-processed data sent by a previous client of the intermediate client 102 in the specified order, wherein the first to-be-processed data includes first encrypted data obtained by the previous client of the intermediate client 102 encrypting the previous client's own service data based on a public key set corresponding to the previous client itself, and first to-be-forwarded data which is obtained based on data received by the previous client of the intermediate client 102 from another client; for encrypting the intermediate client's own service data based on a public key set corresponding to the intermediate client, to obtain second encrypted data; and for sending second to-be-processed data and the second encrypted data to a next client of the intermediate client 102 in the specified order;

the final client 103 is configured for obtaining the second to-be-processed data and the second encrypted data sent by a previous client of the final client 103 in the specified order, wherein, the second to-be-processed data is obtained based on the first to-be-processed data received by the previous client of the final client 103 from another client, and the second encrypted data is obtained by the previous client of the final client 103 encrypting the previous client's own service data based on a public key set corresponding to the previous client itself; for decrypting the second to-be-processed data and the second encrypted data based on the final client's own private key, to obtain service data of each of other clients other than the final client itself; and for sending the service data of each of other clients other than the final client itself and the final client's own service data to a preset service platform.

Based on the above processing, the last client is responsible for sending the service data of each client to the preset service platform, and other clients do not need to send service data to the preset service platform, so that the preset service platform cannot distinguish the multiple pieces of service data to determine a client to which each piece of service data belongs, and cannot associate user's identity data with user's service data, thereby reducing the risk of user's privacy data leakage. In addition, each client sends, to the next client in a specified sorting order, encrypted service data and the to-be-forwarded data obtained based on the data sent by the previous client. That is to say, for each client other than the initial client and the first intermediate client in the specified order, the client can receive multiple pieces of service data from the previous client. However, the client cannot distinguish the multiple pieces of service data to determine the client to which each piece of service data belongs. The first intermediate client in the specified order has not obtained a private key of the last client, and thus cannot decrypt the encrypted service data sent by the initial client, that is, cannot determine the service data of the initial client. That is to say, each client other than the initial client in the specified order is unable to associate the user's identity data with the user's service data, which can further reduce the risk of the user's privacy data leakage.

Figure 2:
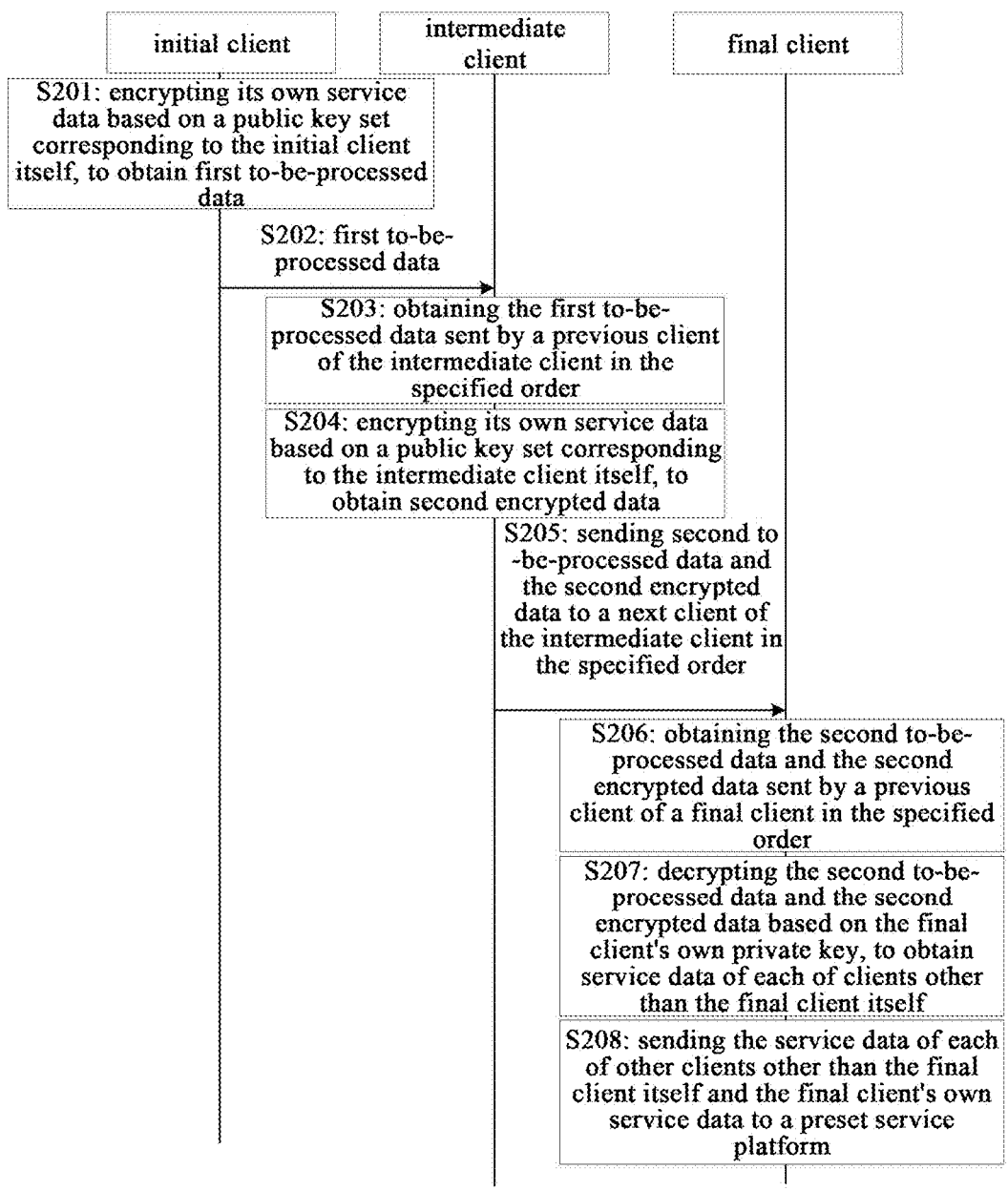
FIG. 2 is a first interaction diagram of a data privacy protection method based on multi-layer encryption provided by an embodiment of the present application.

Based on the same invention concept, an embodiment of the present application further provides a data privacy protection method based on multi-layer encryption, which can be applied to an intermediate client, an initial client, and a final client. The intermediate client, initial client, and final client can be the initial client 101, intermediate client 102, and final client 103 respectively in the data privacy protection system mentioned above. Referring to FIG. 2, FIG. 2 is a first interaction diagram of a data privacy protection method based on multi-layer encryption provided by an embodiment of the present application. The method can include the following steps.

S201: The initial client encrypts its own service data based on a public key set corresponding to the initial client itself, to obtain first to-be-processed data.

The public key set corresponding to a client includes a public key of the last client in a specified order.

S202: The initial client sends the first to-be-processed data to the intermediate client.

S203: The intermediate client obtains the first to-be-processed data sent by a previous client of the intermediate client in the specified order.

The first to-be-processed data includes: first encrypted data obtained by the previous client of the intermediate client encrypting the previous client's own service data based on a public key set corresponding to the previous client itself; and first to-be-forwarded data which is obtained based on data received by the previous client of the intermediate client from another client.

S204: The intermediate client encrypts its own service data based on a public key set corresponding to the intermediate client itself, to obtain second encrypted data.

S205: The intermediate client sends second to-be-processed data and the second encrypted data to a next client of the intermediate client in the specified order.

The second to-be-processed data is obtained based on the first to-be-processed data.

S206: The intermediate client obtains the second to-be-processed data and the second encrypted data sent by a previous client of a final client in the specified order.

The second to-be-processed data is obtained based on the first to-be-processed data received by the previous client of the final client from another client; and the second encrypted data is obtained by the previous client of the final client encrypting the previous client's own service data based on a public key set corresponding to the previous client itself.

S207: The final client decrypts the second to-be-processed data and the second encrypted data based on the final client's own private key, to obtain service data of each of clients other than the final client itself.

S208: The final client sends the service data of each of other clients other than the final client itself and the final client's own service data to a preset service platform.

Based on the above processing, the last client is responsible for sending the service data of each client to the preset service platform, and the other clients do not need to send service data to the preset service platform, so that the preset service platform cannot distinguish the multiple pieces of service data to determine a client to which each piece of service data belongs, and cannot associate user's identity data with user's service data, thereby reducing the risk of user's privacy data leakage. In addition, each client sends, to the next client in a specified sorting order, encrypted service data and the to-be-forwarded data obtained based on the data sent by the previous client. That is to say, for each client other than the initial client and the first intermediate client in the specified order, the client can receive multiple pieces of service data from the previous client. However, the client cannot distinguish the multiple pieces of service data to determine the client to which each piece of service data belongs. The first intermediate client in the specified order has not obtained a private key of the last client, and thus cannot decrypt the encrypted service data sent by the initial client, that is, cannot determine the service data of the initial client. That is to say, each client other than the initial client in the specified order is unable to associate the user's identity data with the user's service data, which can further reduce the risk of the user's privacy data leakage.

Furthermore, in related technologies, user's privacy data can also be protected by adding noise to user's service data. That is, the client can add noise to the service data and send the service data with added noise to a preset service platform. However, adding noise to the service data may lead to a decrease in the accuracy of the service data. In addition, the preset service platform can also perform noise reduction on that service data with added noise, thereby associating user's identity data with the service data, which will increase the risk of user's privacy data leakage either. In contrast, based on the solutions provided by the embodiments of the present application, there is no need to add noise to the user's service data, and thus it will not lead to a decrease in the accuracy of the user's service data. In addition, the last client is responsible for sending the service data of each client to the preset service platform, and the other clients do not need to send the service data to the preset service platform. That is to say, even with the noise reduction processing, the preset service platform cannot distinguish the multiple pieces of service data to determine the client to which each piece of service data belongs, and cannot associate the user's identity data with the user's service data. Therefore, based on the solutions provided by the embodiments of the present application, the risk of user's privacy data leakage can be reduced.

In addition, in related technologies, a gateway can generate a virtual identity for a user based on user's identity data, and further the user can log in to a preset service platform by using the virtual identity through a client and send user's service data to the preset service platform through the client. However, since the gateway can obtain a correspondence between the user's identity data and user's virtual identity, when the user sends his/her service data to the preset service platform through the client, the gateway can also associate user's identity data with user's service data, which will increase the risk of user's privacy data leakage. In contrast, based on the solutions provided by the embodiments of the present application, the last client is responsible for sending the service data of each client to the preset service platform, and the other clients do not need to send the service data to the preset service platform. That is to say, the gateway can only obtain service data of multiple users at once, and cannot distinguish the multiple pieces of service data to determine the client to which each piece of service data belongs, and thus cannot associate the user's identity data with the user's service data. Therefore, based on the solutions provided by the embodiments of the present application, the risk of user's privacy data leakage can be reduced.

In one implementation, when a client needs to send its own service data to a preset service platform, the client can determine other multiple clients that need to send their own service data to the preset service platform, wherein the multiple clients can form a data privacy protection system, and are in a specified order. For example, the multiple clients can determine the position of each of the clients in the specified order based on a preset election method. For example, this preset election method can be implemented based on blockchain.

For steps S201 and S204, each client has its own public and private keys, as well as its own service data. The initial client can encrypt its own service data based on a public key set corresponding to the initial client itself by using an encryption algorithm. For example, the encryption algorithm can be an asymmetric encryption algorithm such as RSA algorithm or SM2 algorithm.

For steps S202, S203, S205, and S206, the initial client is a first client, the intermediate client is any client other than the first client and the last client, and the final client is a last client. It can be understood that a next client of the initial client is the intermediate client, and a previous client of the final client is the intermediate client.

For example, the data privacy protection system includes Client 1, Client 2, Client 3, and Client 4, and in a specified order, Client 1 is a previous client of Client 2, Client 2 is a previous client of Client 3, and Client 3 is a previous client of Client 4. At this point, Client 1 is an initial client, Client 2 and Client 3 are intermediate clients, and Client 4 is a final client.

Since the initial client is a first client, it will not receive data sent by other clients. Therefore, the initial client will only send first to-be-processed data obtained by encrypting its own service data based on a public key set corresponding to the initial client itself to a second client in the specified order (i.e. the first intermediate client).

Correspondingly, if a previous client of an intermediate client is an initial client, that is, when the intermediate client is the first intermediate client, the first to-be-processed data obtained by the intermediate client from the initial client includes data obtained by encrypting service data of the initial client based on a public key set corresponding to the initial client. It can be understood that the first to-be-processed data received by the first intermediate client only includes the data obtained by the initial client encrypting the initial client's own service data based on a public key set corresponding to the initial client, and does not include data sent by other clients to the initial client.

If a previous client of an intermediate client is an intermediate client, the first to-be-processed data obtained by the intermediate client from the previous client includes: first encrypted data obtained by encrypting service data of the previous client based on a public key set corresponding to the previous client, and first to-be-forwarded data obtained based on data received by the previous client from another client. It can be understood that when a previous client of an intermediate client is an intermediate client, the data received by the previous client from other clients is also the data sent by a previous client of that previous client.

For the step S207, each client sends, to the next client in the specified order, the encrypted service data, and the to-be-forwarded data obtained based on the data sent by the previous client. That is to say, for each client other than the initial client and the first intermediate client in the specified order, the client can receive multiple pieces of encrypted service data from the previous client, and the multiple pieces of encrypted service data contain service data of all of the clients located before the client. Therefore, the final client can obtain encrypted service data of all other clients other than itself in the data privacy protection system. Further, the final client can decrypt each encrypted data based on its own private key, to obtain service data of each of other clients other than the final client itself.

For step S208, the preset service platform represents a service platform that needs to obtain user's service data. For example, the preset service platform can be a smart healthcare service platform.

The client can encrypt its own service data based on a public key set corresponding to the client itself, at least by the following methods:

Method 1: each client encrypts its own service data by using a public key of a final client, to obtain second encrypted data.

For each client in the data privacy protection system other than the final client, the client can encrypt its own service data by using the public key of the final client, and send the encrypted service data to a next client of the client in the specified order. Correspondingly, when the next client is not the final client, the next client can send the received data and the next client's own encrypted service data to a next client of the next client itself. And so on, the final client can receive multiple pieces of service data encrypted by using the final client's own public key, that is, the data received by the final client includes service data encrypted by other clients respectively using the public key of the final client. Further, the final client can use its own private key to decrypt the multiple pieces of encrypted data, to obtain service data of each of other clients.

For example, there are N clients in the data privacy protection system and the specified order for N clients is represented as: Client 1, Client 2, . . . , Client N. Public and private keys of Client X are represented as ($pk_X$, $sk_X$), and service data of Client X is represented as mx, wherein, $pk_X$ represents the public key of Client X, and $sk_X$ represents the private key of Client X. The value of X can be 1, 2, . . . or N.

Furthermore, each client can encrypt its service data by using the public key $pk_N$ of the final client (i.e. Client N), to obtain encrypted data, and send the encrypted data and the received data to the next client. For example, the encrypted data can be represented as $c_X^N = E(pk_N, m_X)$. E represents Encipher, $c_X^N$ represents encrypted data which is obtained by encrypting service data mx of the X-th client (i.e. Client X) in the specified order by the X-th client (i.e. Client X) using a public key $pk_N$ of Client N. For example, $c_1^N = E(pk_N, m_1)$ is encrypted data obtained by the first client encrypting its own service data $m_1$, $c_2^N = E(pk_N, m_2)$ is encrypted data obtained by the second client encrypting its own service data $m_2$. Client 1 can send $c_1^N$ to Client 2, Client 2 can send $c_1^N$ and $c_2^N$ to Client 3, and so on.

Client N can receive $c_1^N, c_2^N, \ldots,$ and $c_{N-1}^N$, and can decrypt the received multiple pieces of encrypted data based on its own private key $sk_N$, to obtain multiple pieces of service data $m_1, m_2, \ldots, m_{N-1}$.

Based on an encryption method of Method 1 mentioned above, any client other than the final client only needs to encrypt its own service data by using the public key of the final client, therefore encrypting service data has low complexity, high encryption speed, and less computational resources consumed. In addition, any client other than the final client does not need to decrypt the encrypted data received from other clients, and directly forwards it to the next client, which can also reduce the processing complexity for the client and improve the efficiency of data privacy protection based on multi-layer encryption.

Figure 3:
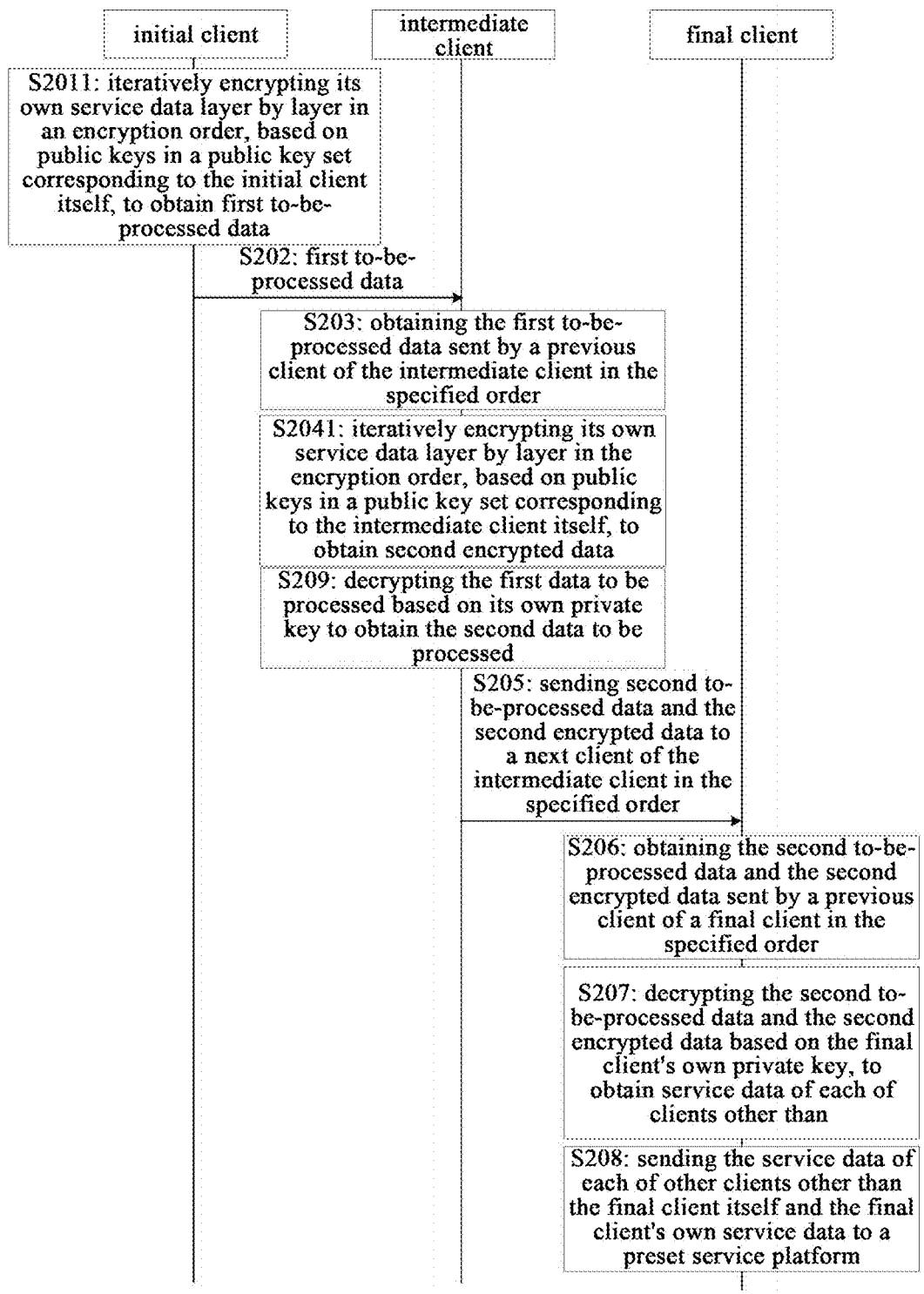
FIG. 3 is a second interaction diagram of a data privacy protection method based on multi-layer encryption provided by an embodiment of the present application.

Method 2: each client encrypts its own service data by using public keys of all of the clients located after the client in the specified order, to obtain second encrypted data. Correspondingly, in some embodiments, referring to FIG. 3, FIG. 3 is a second interaction diagram of a data privacy protection method based on multi-layer encryption provided by an embodiment of the present application. On the basis of FIG. 2, the step S201 includes:

S2011: the initial client iteratively encrypts its own service data layer by layer in an encryption order, based on public keys in a public key set corresponding to the initial client itself, to obtain first to-be-processed data.

The encryption order is opposite to the specified order for the clients corresponding to the public keys.

Correspondingly, prior to step S205, the method further includes:

S209: the intermediate client decrypts the first to-be-processed data based on its own private key to obtain second to-be-processed data.

Correspondingly, the step S204 includes:

S2041: the intermediate client iteratively encrypts its own service data layer by layer in the encryption order, based on public keys in a public key set corresponding to the intermediate client itself, to obtain second encrypted data.

In order to further improve the security of user's service data and reduce the risk of user's privacy data leakage, a public key set corresponding to a client can further include a public key of a client located between the client and the last client in the specified order. That is to say, the public key set corresponding to a client includes: public keys of all of clients located after the client in the specified order.

The intermediate client iteratively encrypts its own service data layer by layer, that is to say, the intermediate client performs the multiple-layer encryption on its own service data, and data that needs to be encrypted in each layer is the encrypted data in the previous layer. It can be understood that the intermediate client performs the first-layer encryption on its own service data by using the public key of the final client, and performs the last-layer encryption on its own service data by using the public key of the next client of the intermediate client. Correspondingly, the intermediate client sends the encrypted service data to the next client, which can decrypt the encrypted service data based on the next client's own private key.

For ease of understanding, the encrypting process can be analogized to a locking process, and the decrypting process can be analogized to an unlocking process. For example, Client 1 can lock its own service data by using a lock of Client N, a lock of Client N−1, . . . , and a lock of Client 2, to obtain first to-be-processed data, and send the first to-be-processed data to Client 2. Further, Client 2 can use its own key to unlock the lock of Client 2 in an outermost layer of the first to-be-processed data, to obtain service data (which can be referred to as the first decrypted data) of Client 1 encrypted by using the lock of Client N, the lock of Client N−1, . . . , and the lock of Client 3, and Client 2 can lock its own service data by using the lock of Client N, the lock of Client N−1, . . . , and the lock of Client 3, to obtain first encrypted data, and send the first decrypted data and the first encrypted data to the Client 3.

Further, Client 3 can use its own key to unlock the lock of Client 3 in an outermost layer of the first decrypted data and an outermost layer of the first encrypted data, to obtain the service data of Client 1 and the service data of Client 2 encrypted by using the lock of Client N, the lock of Client N−1, . . . , the lock of Client 4, and Client 3 can lock its own service data by using the lock of Client N, the lock of Client N−1, . . . , the lock of Client 4 (i.e. the second to-be-processed data), to obtain the second encrypted data, and send the second to-be-processed data and the second encrypted data to Client 4, and so on.

Client N can obtain the service data of Client 1, the service data of Client 2, . . . , and the service data of Client N−1 encrypted by using the lock of Client N. Further, Client N can use its own key to unlock the lock of Client N in an outermost layer of each piece of data, to obtain the service data of Client 1, the service data of Client 2, . . . , and the service data of Client N−1, that is, to obtain the service data of each of other clients other than itself.

Based on the above processing, the service data of a client itself is encrypted by using public keys of the multiple clients. Therefore, for a client that receives the encrypted service data, the client can decrypt the encrypted service data only upon obtaining private keys corresponding to the public keys of the multiple clients, thereby increasing the difficulty of obtaining plaintext service data, further improving the security of user's service data, and reducing the risk of user's privacy data leakage.

In some embodiments, on the basis of FIG. 3, step S2011 includes:

Step 1: the initial client obtains its own service data as the current to-be-encrypted data, and determines the last client as the current candidate client.

Step 2: the initial client encrypts the current to-be-encrypted data based on a public key of the current candidate client, to obtain the current intermediate encrypted data.

Step 3: the initial client takes a previous client of the current candidate client as the current candidate client and takes the current intermediate encrypted data as the current to-be-encrypted data, in the specified order; and returns to perform the operation of encrypting the current to-be-encrypted data based on a public key of the current candidate client to obtain the current intermediate encrypted data, until the current to-be-encrypted data is encrypted based on the public key of the next client of the initial client in the specified order to obtain the current intermediate encrypted data as the first to-be-processed data.

Correspondingly, the step S2041 includes:

Step 4: the intermediate client obtains its own service data as the current to-be-encrypted data, and determines the last client as the current candidate client.

Step 5: the intermediate client encrypts the current to-be-encrypted data based on a public key of the current candidate client, to obtain the current intermediate encrypted data.

Step 6: the intermediate client takes a previous client of the current candidate client as the current candidate client in the specified order, and takes the current intermediate encrypted data as the current to-be-encrypted data, returns to perform the operation of encrypting the current to-be-encrypted data based on a public key of the current candidate client to obtain the current intermediate encrypted data, until the current to-be-encrypted data is encrypted based on the public key of the next client of the intermediate client in the specified order to obtain the current intermediate encrypted data as the second encrypted data.

For example, when there are N clients in a data privacy protection system, the specified order for the N clients is represented as: Client 1, Client 2, . . . , and Client N. Correspondingly, the encryption order is represented as: Client N, Client N−1, . . . , Client 2, and Client 1. That is, the service data is encrypted in the order of $pk_N$, $pk_{N-1}$, . . . , $pk_2$, and $pk_1$.

As for client 1, the current to-be-encrypted data is $m_1$. In the specified order, clients located between Client 1 and the last client (i.e. Client N) are Client 2, . . . , and Client N−1. Therefore, a public key set corresponding to Client 1 includes: $pk_N$, $pk_{N-1}$, . . . , and $pk_2$.

The current candidate client is Client N, and a public key of Client N is $pk_N$. Therefore, the current intermediate encrypted data can be represented as $E(pk_N, m_1)$.

Further, Client 1 takes Client N−1 as the current candidate client in the specified order and takes the current intermediate encrypted data $E(pk_N, n_1)$ as the current to-be-encrypted data, to obtain the current intermediate encrypted data $E(pk_{N-1}, E(pk_N, m_1))$ by encrypting. And so on, until the current to-be-encrypted data is encrypted based on the public key of the next client (i.e. Client 2) of Client 1 in the specified order, to obtain the current intermediate encrypted data as the first to-be-processed data. The first to-be-processed data can be represented as $c_1^1 = E(pk_2, E(pk_3, \ldots E(pk_N, m_1) \ldots ))$.

Correspondingly, each intermediate client can encrypt its own service data in the same way as mentioned above. For each client, the encrypted service data can be represented as $$c_X^X = E(pk_{X+1}, E(pk_{X+2}, \ldots (E(pk_N, m_X) \ldots )).$$

$c_X^X$ represents the encrypted data obtained by the X-th client (i.e. Client X) in the specified order encrypting its own service data mx, by using the public key $pk_N$ of Client N, the public key $pk_{N-1}$ of Client N−1, . . . , and the public key $pk_{X+1}$ of Client X+1. As Client 1 can obtain $$c_1^1 = E(pk_2, E(pk_3, \ldots (E(pk_N, m_1) \ldots )$$

after encrypting its own service data $m_1$, Client 2 can obtain $$c_2^2 = E(pk_3, E(pk_4, \ldots (E(pk_N, m_1) \ldots )$$

after encrypting its own service data, and so on.

After obtaining the first to-be-processed data, Client 2 can decrypt the first to-be-processed data sent by Client 1 based on Client 2's own private key $sk_2$, to obtain $$c_1^2 = E(pk_3, \ldots (E(pk_N, m_1) \ldots )).$$

Correspondingly, Client 2 can encrypt its own service data based on a public key set corresponding to Client 2, to obtain $$c_2^2 = E(pk_3, E(pk_4, \ldots (E(pk_N, m_1) \ldots )).$$

Further, Client 2 can send $c_1^2$ and $c_2^2$ to Client 3.

Correspondingly, Client 3 can decrypt $c_1^2$ and $c_2^2$ based on its own private key $sk_3$, to obtain $$c_1^3 = E(pk_4, \ldots (E(pk_N, m_1) \ldots )$$

and $$c_2^3 = E(pk_4, \ldots (E(pk_N, m_2) \ldots )).$$

Moreover Client 3 can encrypt its service data based on a public key set corresponding to Client 3, to obtain $$c_3^3 = E(pk_4, \ldots (E(pk_N, m_3) \ldots )).$$

Further, Client 3 can send $c_1^3$, $c_2^2$, and $c_3^3$ to Client 4. And so on.

Client N can receive $c_1^{N-1}$, $c_2^{N-1}$ and $c_{N-1}^{N-1}$. Furthermore, Client N can decrypt the received multiple pieces of data based on its own private key $sk_N$ to obtain multiple service data $m_1$, $m_2$, . . . , and $m_{N-1}$.

Based on the above processing, the service data of a client is encrypted by using public keys of the multiple clients. Therefore, for a client that receives the encrypted service data, the client can decrypt the encrypted service data only upon obtaining private keys corresponding to the public keys of the multiple clients, thereby increasing the difficulty of obtaining plaintext service data, further improving the security of user's service data, and reducing the risk of user's privacy data leakage.

Figure 4:
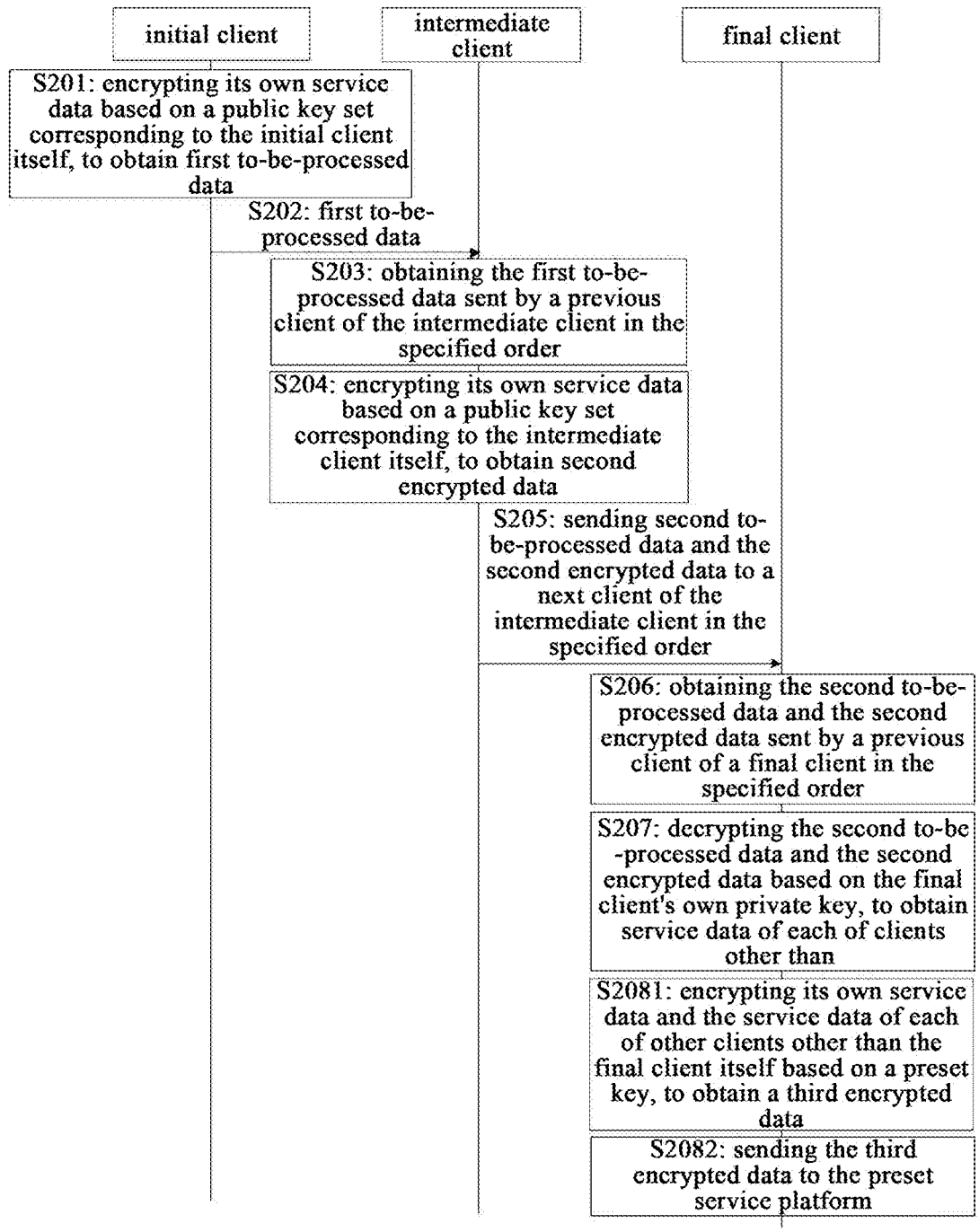
FIG. 4 is a third interaction diagram of a data privacy protection method based on multi-layer encryption provided by an embodiment of the present application.

In some embodiments, referring to FIG. 4, FIG. 4 is a third interaction diagram of a data privacy protection method based on multi-layer encryption provided by an embodiment of the present application. On the basis of FIG. 2, the step S208 includes:

S2081: the final client encrypts its own service data and the service data of each of other clients other than the final client itself based on a preset key, to obtain a third encrypted data.

S2082: the final client sends the third encrypted data to the preset service platform.

In one implementation, the preset service platform can generate the preset key based on a key generation algorithm in advance, and send the preset key to multiple clients in a broadcasting manner. Further, the final client can encrypt multiple pieces of service data based on the preset key sent by the preset service platform by using an encryption algorithm.

For example, the encryption algorithm can be a symmetric encryption algorithm, such as AES (Advanced Encryption Standard) algorithm, IDEA (International Data Encryption Algorithm), or PBE (Password Based Encryption) algorithm.

For example, the encryption algorithm can also be an asymmetric encryption algorithm such as RSA algorithm, or SM2 algorithm in the above embodiments. In this case, the preset service platform can send the generated public key to the multiple clients.

Based on the above processing, the final client can encrypt the multiple pieces of service data based on the preset key, and then send the multiple pieces of encrypted service data to the preset service platform. By encrypting the service data, the difficulty of obtaining plaintext service data increases, the security of user's service data is further improved, and the risk of user's privacy data leakage reduces.

In one method, the preset service platform can send response data including service data of each of multiple clients and a response result corresponding to the service data of each of multiple clients, to the multiple clients in a broadcasting manner. Further, when the client in the data privacy protection system obtains the response data, the client can determine its own service data from the response data, and then determine the response result corresponding to the client's own service data. That is to say, the response data can also represent a correspondence between the service data and the response result. Based on this correspondence, each of the clients can determine the response result corresponding to its own service data.

Figure 5:
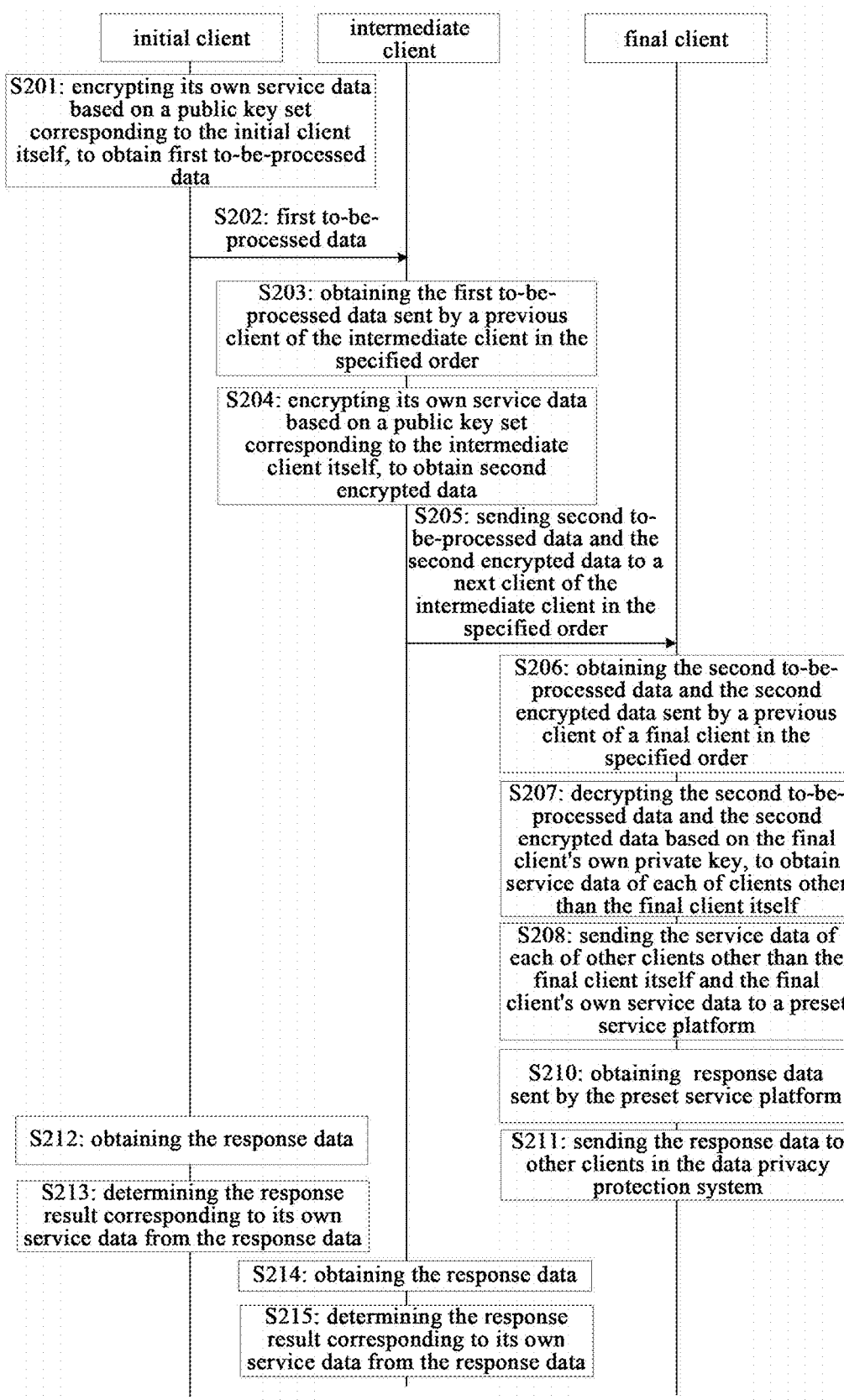
FIG. 5 is a fourth interaction diagram of a data privacy protection method based on multi-layer encryption provided by an embodiment of the present application.

In another method, the preset service platform can send response data to the final client. Referring to FIG. 5, FIG. 5 is a fourth interaction diagram of a data privacy protection method based on multi-layer encryption provided by an embodiment of the present application. On the basis of FIG. 2, after the step S208, the method further includes:

S210: the final client obtains response data sent by the preset service platform.

The response data includes service data of each of multiple clients and a response result corresponding to the service data of each of multiple clients;

S211: the final client sends the response data to other clients in the data privacy protection system.

S212: the initial client obtains the response data.

S213: the initial client determines the response result corresponding to its own service data from the response data.

S214: the intermediate client obtains the response data.

S215: the intermediate client determines the response result corresponding to its own service data from the response data.

It can be understood that the order in which other clients other than the final client obtain the response data is not limited in this method. For any client, when the client obtains the response data, the client can determine the response result corresponding to client's own service data from the response data.

After obtaining the data (i.e. service data) sent by the final client, the preset service platform can respond to the data and obtain the a response result corresponding to each piece of data. For example, when the preset service platform is the smart healthcare service platform, and the data sent by the final client to the smart healthcare service platform is the physical condition information of multiple users, the response result corresponding to each piece of data can be a diagnosis and treatment result corresponding to each piece of physical condition information.

The preset service platform can send response data to the final client. Further, after obtaining the response data, the final client can send the response data to multiple clients in the data privacy protection system. For example, the final client can send the response data to the multiple clients in the data privacy protection system in a broadcasting manner. Since the response data includes service data of each of the multiple clients and the response result corresponding to the service data of each of the multiple clients, each client can determine its own service data from the response data, and further determine the response result corresponding to its own service data.

Based on the above processing, in the case where the final client sends service data of multiple users to the preset service platform, each client can obtain the response result of the preset service platform in response to client's own service data. In addition, compared to the above method in which the preset service platform sends the response data to the multiple clients in a broadcasting manner, based on the method provided by the embodiments of the present application, the preset service platform only needs to send the response data to the final client without sending the response data via broadcasting, which can reduce the occupation on network resources. And the preset service platform does not need to know address information of each of the clients corresponding to the response data, so the leakage of relevant information of the clients can be reduced, thereby further improving the security of user's service data, and reducing the risk of user's privacy data leakage.

In one method, each client can generate its own public and private keys, and sending its own public key to other clients in the data privacy protection system via broadcasting. Further, each client in the data privacy protection system can obtain public keys of other clients and determine a public key set corresponding to the client itself.

In another method, based on the encryption method in the Method 2 mentioned above, on the basis of FIG. 2, before the step S201, the method further includes:

the intermediate client generates its own public and private keys, and sends its own public key to a client in the data privacy protection system that is located before the intermediate client in the specified order;

the final client generates its own public and private keys, and sends its own public key to other clients in the data privacy protection system.

Based on the above processing, each client can obtain the public keys of other clients, to obtain a public key set corresponding to the client itself, and then can encrypt its own service data based on the public key set corresponding to the client itself. By encrypting client's own service data by using the public keys of multiple clients, the difficulty of obtaining plaintext service data increases, the security of user's service data is further improved, and the risk of user's privacy data leakage reduces.

Figure 6:
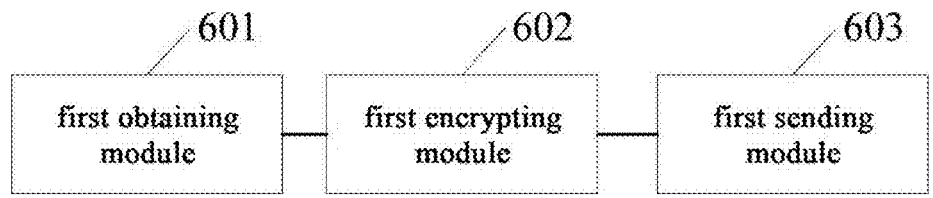
FIG. 6 is a first structural diagram of a data privacy protection apparatus based on multi-layer encryption provided by an embodiment of the present application.

Based on the same invention concept as the data privacy protection method based on multi-layer encryption mentioned above, the embodiments of the present application further provide a data privacy protection apparatus based on multi-layer encryption, which is applied to an intermediate client of multiple clients included in a data privacy protection system; the multiple clients are in a specified order, and the intermediate client is any client other than the first client and the last client in the specified order. Referring to FIG. 6, FIG. 6 is a first structural diagram of a data privacy protection apparatus based on multi-layer encryption provided by an embodiment of the present application. The apparatus includes:

a first obtaining module 601, configured for obtaining first to-be-processed data sent by a previous client of the intermediate client in the specified order, wherein the first to-be-processed data includes first encrypted data obtained by the previous client of the intermediate client encrypting the previous client's own service data based on a public key set corresponding to the previous client itself, and first to-be-forwarded data which is obtained based on data received by the previous client of the intermediate client from another client; and wherein a public key set corresponding to a client includes a public key of the last client;

a first encrypting module 602, configured for encrypting the intermediate client's own service data based on the public key set corresponding to the intermediate client itself, to obtain second encrypted data;

a first sending module 603, configured for sending second to-be-processed data and the second encrypted data to a next client of the intermediate client in the specified order, so that the last client decrypts, after receiving the data, the received data based on its own private key to obtain service data of each of other clients other than the last client itself, and sends the service data of each of other clients other than the last client itself and the last client's own service data to a preset service platform; wherein the second to-be-processed data is obtained based on the first to-be-processed data.

In one optional embodiment, the public key set corresponding to a client further includes a public key of a client located between the client and the last client in the specified order; the first encrypted data is obtained by the previous client of the intermediate client iteratively encrypting the previous client's own service data layer by layer based on public keys in the public key set corresponding to the previous client itself, in an encryption order corresponding to the public keys; wherein the encryption order is opposite to a specified order for clients corresponding to the public keys;

the first to-be-forwarded data is obtained by the previous client of the intermediate client decrypting the data sent by another client based on the previous client's own private key;

the apparatus further includes:

a first decrypting module, configured for: before sending the second to-be-processed data and the second encrypted data to the next client of the intermediate client in the specified order, decrypting the first to-be-processed data based on the intermediate client's own private key to obtain the second to-be-processed data;

the first encrypting module 602 is specifically configured for iteratively encrypting the intermediate client's own service data layer by layer in the encryption order based on public keys in the public key set corresponding to the intermediate client itself, to obtain the second encrypted data.

In one optional embodiment, the first encrypting module 602 includes:

a first pre-processing sub-module, configured for obtaining the intermediate client's own service data as current to-be-encrypted data, and determining the last client as a current candidate client;

a first intermediate encrypting sub-module, configured for encrypting the current to-be-encrypted data based on a public key of the current candidate client, to obtain current intermediate encrypted data;

a first processing sub-module, configured for: in the specified order, taking a previous client of the current candidate client as the current candidate client and taking the current intermediate encrypted data as the current to-be-encrypted data, and returning to perform an operation of encrypting the current to-be-encrypted data based on the public key of the current candidate client to obtain the current intermediate encrypted data, until the current to-be-encrypted data is encrypted based on a public key of a next client of the intermediate client in the specified order to obtain the current intermediate encrypted data as the second encrypted data.

In one optional embodiment, the apparatus further includes:

a second obtaining module, configured for: after sending the second to-be-processed data and the second encrypted data to the next client of the intermediate client in the specified order, obtaining response data sent by the last client; wherein, the response data includes service data of each of the multiple clients and a response result corresponding to the service data of each of the multiple clients, and the response data is sent by the preset service platform to the last client; a first response result determining module, configured for determining a response result corresponding to the intermediate client's own service data from the response data.

In one optional embodiment, the apparatus further includes:

a first generating module, configured for: before obtaining the first to-be-processed data sent by the previous client of the intermediate client in the specified order, generating the intermediate client's own public and private keys, and sending the intermediate client's own public key to a client in the data privacy protection system that is located before the intermediate client in the specified order.

Figure 7:
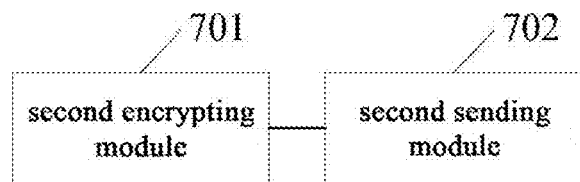
FIG. 7 is a second structural diagram of a data privacy protection apparatus based on multi-layer encryption provided by an embodiment of the present application.

Based on the same invention concept as the multi-layer encryption based data privacy protection method mentioned above, an embodiment of the present application further provides a data privacy protection apparatus based on multi-layer encryption, which is applied to an initial client of multiple clients included in the data privacy protection system; wherein the multiple clients are in a specified order, and the initial client is a first client in the specified order. Referring to FIG. 7, FIG. 7 is a second structural diagram of the data privacy protection apparatus based on multi-layer encryption provided by the embodiment of the present application, the apparatus includes:

a second encrypting module 701, configured for encrypting the initial client's own service data based on a public key set corresponding to the initial client itself, to obtain first to-be-processed data; wherein a public key set corresponding to a client includes a public key of a last client in the specified order;

a second sending module 702, configured for sending the first to-be-processed data to a next client of the initial client in the specified order, so that the next client of the initial client in the specified order obtains second to-be-forwarded data based on the first to-be-processed data, encrypts the next client's own service data based on the public key set corresponding to the next client itself to obtain second encrypted data, and sends the second to-be-forwarded data and the second encrypted data to a next client of the next client itself, such that the last client decrypts, after receiving the data, the received data based on its own private key to obtain service data of each of other clients other than the last client itself, and sends the service data of each of other clients other than the last client itself and the last client's own service data to a preset service platform.

In one optional embodiment, the public key set corresponding to a client further includes a public key of a client located between the client and the last client in the specified order;

the second to-be-forwarded data is obtained by the next client of the initial client decrypting the first to-be-processed data based on the next client's own private key;

the second encrypting module 701 is specifically configured for iteratively encrypting the initial client's own service data layer by layer in an encryption order based on public keys in the public key set corresponding to the initial client itself, to obtain the first to-be-processed data, wherein the encryption order is opposite to a specified order for clients corresponding to the public keys.

In one optional embodiment, the second encrypting module 701 includes:

a second pre-processing sub-module, configured for obtaining the initial client's own service data as current to-be-encrypted data, and determining the last client as a current candidate client;

a second intermediate encrypting sub-module, configured for encrypting the current to-be-encrypted data based on a public key of the current candidate client, to obtain current intermediate encrypted data;

a second processing sub-module, configured for: in the specified order, taking a previous client of the current candidate client as the current candidate client, and taking the current intermediate encrypted data as the current to-be-encrypted data, and returning to perform an operation of encrypting the current to-be-encrypted data based on the public key of the current candidate client to obtain the current intermediate encrypted data, until the current to-be-encrypted data is encrypted based on a public key of a next client of the initial client in the specified order to obtain the current intermediate encrypted data as the first to-be-processed data.

In one optional embodiment, the apparatus further includes:

a third obtaining module, configured for, after sending the first to-be-processed data to the next client of the initial client in the specified order, obtaining response data sent by the last client; wherein, the response data includes service data of each of the multiple clients and a response result corresponding to the service data of each of the multiple clients, and the response data is sent by the preset service platform to the last client;

a second response result determining module, configured for determining a response result corresponding to the initial client's own service data from the response data.

Figure 8:
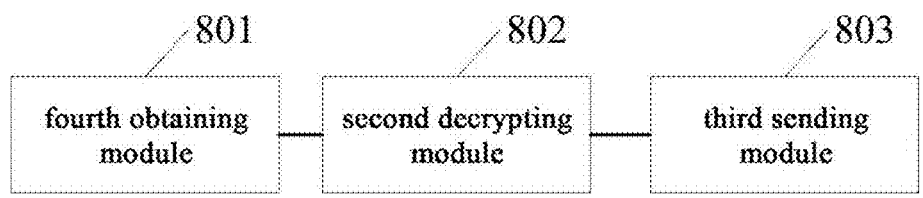
FIG. 8 is a third structural diagram of a data privacy protection apparatus based on multi-layer encryption provided by an embodiment of the present application.

Based on the same invention concept as the multi-layer encryption based data privacy protection method mentioned above, an embodiment of the present application further provides a data privacy protection apparatus based on multi-layer encryption, which is applied to a final client of multiple clients included in the data privacy protection system; the multiple clients are in a specified order, and the final client is a last client in the specified order. Referring to FIG. 8, FIG. 8 is a third structural diagram of the data privacy protection apparatus based on multi-layer encryption provided by the embodiment of the present application, the apparatus includes:

a fourth obtaining module 801, configured for obtaining second to-be-processed data and second encrypted data sent by a previous client of the final client in the specified order, wherein the second to-be-processed data is obtained based on first to-be-processed data received by the previous client of the final client from another client; the second encrypted data is obtained by the previous client of the final client encrypting the previous client's own service data based on a public key set corresponding to the previous client itself; a public key set corresponding to a client includes a public key of the final client;

a second decrypting module 802, configured for decrypting the second to-be-processed data and the second encrypted data based on the final client's own private key, to obtain service data of each of other clients other than the final client itself;

a third sending module 803, configured for sending the service data of each of other clients other than the final client itself and the final client's own service data to a preset service platform.

In one optional embodiment, the public key set corresponding to a client further includes a public key of a client located between the client and the final client in the specified order;

the second to-be-processed data is obtained by the previous client of the final client decrypting the first to-be-processed data sent by another client based on the previous client's own private key;

the second encrypted data is obtained by the previous client of the final client iteratively encrypting the previous client's own service data layer by layer in an encryption order based on a public key set corresponding to the previous client itself; wherein the encryption order is opposite to a specified order for clients corresponding to public keys.

In one optional embodiment, the third sending module 803 includes:

a third encrypting sub-module, configured for encrypting the service data of each of other clients other than the final client itself and the final client's own service data based on a preset key, to obtain third encrypted data;

a fourth encrypting sub-module, configured for sending the third encrypted data to the preset service platform.

In one optional embodiment, the apparatus further includes:

a fifth obtaining module, configured for, after sending the service data of each of other clients other than the final client itself and the final client's own service data to the preset service platform, obtaining response data sent by the preset service platform; wherein the response data includes service data of each of the multiple clients and a response result corresponding to the service data of each of the multiple clients;

a fifth sending module, configured for sending the response data to other clients in the data privacy protection system.

In one optional embodiment, the apparatus further includes:

a second generating module, configured for, before obtaining the second to-be-processed data and the second encrypted data sent by the previous client of the final client in the specified order, generating the final client's own public and private keys, and sending the final client's own public key to other clients in the data privacy protection system.

The obtaining, storage, use, processing, transmission, provision, and disclosure of user personal information involved in the technical solutions of the present application are all carried out under the authorization of the user.

Figure 9:
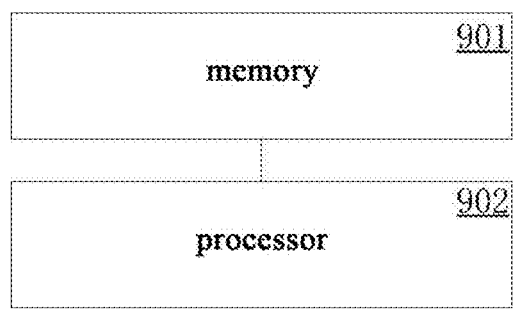
FIG. 9 is a schematic diagram of an electronic device provided by an embodiment of the present application.

An embodiment of the present application further provides an electronic device, as shown in FIG. 9. FIG. 9 is a schematic diagram of an electronic device provided by the embodiment of the present application, which includes:

a memory 901, configured for storing a computer program;

a processor 902, configured for carrying out steps of any one of the data privacy protection methods based on multi-layer encryption in the above embodiments when executing the program stored in the memory 901.

Moreover, the above-mentioned electronic device may also include a communication bus and/or communication interface. The processor 902, the communication interface, and the memory 901 communicate with each other through the communication bus.

The communication bus mentioned in the above electronic device can be a Peripheral Component Interconnect standard (PCI) bus or an Extended Industry Standard Architecture (EISA) bus, etc. The communication bus can be divided into an address bus, a data bus, a control bus, etc. For ease of representation, only one thick line is used in the figure, but it does not mean that there is only one bus or one type of bus.

The communication interface is used for the communication between the above electronic device and other devices.

The memory may include a Random Access Memory (RAM), and can also include a Non-Volatile Memory (NVM), such as at least one disk memory. In one optional embodiment, the memory can also be at least one storage device located far away from the aforementioned processor.

The above processor can be a general-purpose processor, including a Central Processing Unit (CPU), a Network Processor (NP), etc.; it can also be a Digital Signal Processor (DSP), an Application Specific Integrated Circuit (ASIC), a Field-Programmable Gate Array (FPGA), or other programmable logic devices, discrete gates or transistor logic devices, or discrete hardware components.

In yet another embodiment provided by the present application, a non-temporary computer-readable storage medium is further provided. The non-temporary computer-readable storage medium having a computer program storing thereon, that when executed by the processor, carries out steps of any one of the aforementioned data privacy protection methods based on multi-layer encryption.

In yet another embodiment provided by the present application, a computer program product containing instructions is further provided, which, when running on a computer, cause the computer to carry out steps of any one of the data privacy protection methods based on multi-layer encryption in the above embodiments.

In the above embodiment, it can be realized in whole or in part by software, hardware, firm ware or any combination thereof. When implemented by software, it can be realized in the form of a computer program product in whole or in part. The computer program product includes one or more computer instructions. When the computer program instruction is loaded and executed on the computer, the flows or functions described in the embodiment of the present application are generated in whole or in part. The computer can be a general purpose computer, a special purpose computer, a computer network, or other programmable devices. The computer instruction can be stored in a non-temporary computer-readable storage medium, or transferred from one non-temporary computer-readable storage medium to another non-temporary computer-readable storage medium. For example, the computer instruction can be transferred from a website, a computer, a server or a data center to another website site, computer, server or data center by wire (such as coaxial cable, optical fiber, digital subscriber line (DSL)) or wirelessly (such as infrared, wireless, microwave, etc.). The non-temporary computer-readable storage medium can be any available medium that can be accessed by a computer or a data storage device including a server, a data center and the like integrated with one or more available media. The available media can be magnetic media (for example, floppy disk, hard disk, magnetic tape), optical media (for example, DVD), or storage media (for example, solid state disk (SSD)), etc.

It should be noted that in this article, relational terms such as first and second are only to distinguish one entity or operation from another, and do not necessarily require or imply any actual relationship or order between these entities or operations. Moreover, the terms "include", "comprise", or any other variation thereof are intended to encompass non-exclusive inclusion, such that a process, method, article, or device that includes a series of elements not only includes those elements, but also other elements that are not explicitly listed, or also include elements inherent in such a process, method, article, or device. Without further limitations, the elements limited by the statement "including one . . . " do not exclude the existence of other identical elements in the process, method, article, or device that includes the elements.

The various embodiments in this specification are described in a relevant manner, and the same and similar parts between the various embodiments can be referred to each other, and each embodiment focuses on the differences from other embodiments. In particular, for the embodiments of the apparatus, system, electronic device, non-temporary computer-readable storage media and computer program product, since the description is basically similar to the embodiments of methods, it is relatively simple, and the relevant points can be referred to the partial description of the embodiments of the method.

The above descriptions are only preferred embodiments of the present application, and are not intended to limit the present application. Any modifications, equivalent replacements, improvements, etc. made within the spirit and principles of the present application should be included within the scope of the present application.

The invention claimed is:

1. A data privacy protection method based on multi-layer encryption, which is applied to an intermediate client of multiple clients comprised in a data privacy protection system; wherein the multiple clients are in a specified order, and the intermediate client is any client other than a first client and a last client in the specified order, the method comprises:

obtaining first to-be-processed data sent by a previous client of the intermediate client in the specified order, wherein the first to-be-processed data comprises first encrypted data obtained by the previous client of the intermediate client encrypting service data of the previous client itself based on a public key set corresponding to the previous client itself, and first to-be-forwarded data which is obtained based on data received by the previous client of the intermediate client from another client; and wherein a public key set corresponding to a client comprises a public key of the last client;

encrypting service data of the intermediate client itself based on a public key set corresponding to the intermediate client itself, to obtain second encrypted data;

sending second to-be-processed data and the second encrypted data to a next client of the intermediate client in the specified order, so that the last client decrypts, after receiving the data, the received data based on a private key of the last client itself to obtain service data of each of other clients other than the last client itself, and sends the service data of each of other clients other than the last client itself and service data of the last client itself to a preset service platform; wherein the second to-be-processed data is obtained based on the first to-be-processed data; the data received by the last client comprises second to-be-processed data and second encrypted data sent by a previous client of the last client.

2. The method according to claim 1, wherein the public key set corresponding to the client comprises public keys of all clients located after this client in the specified order;
the first encrypted data is obtained by the previous client of the intermediate client iteratively encrypting the service data of the previous client itself layer by layer based on public keys in the public key set corresponding to the previous client itself, in an encryption order corresponding to the public keys; wherein the encryption order is opposite to a specified order for clients corresponding to the public keys;
the first to-be-forwarded data is obtained by the previous client of the intermediate client decrypting the data sent by another client based on a private key of the previous client itself;
before sending the second to-be-processed data and the second encrypted data to the next client of the intermediate client in the specified order, the method further comprises:
decrypting the first to-be-processed data based on a private key of the intermediate client itself, to obtain the second to-be-processed data;
encrypting the service data of the intermediate client itself based on the public key set corresponding to the intermediate client itself, to obtain the second encrypted data, comprises:
iteratively encrypting the service data of the intermediate client itself layer by layer in the encryption order based on public keys in the public key set corresponding to the intermediate client itself, to obtain the second encrypted data.

3. The method according to claim 2, wherein iteratively encrypting the service data of the intermediate client itself layer by layer in the encryption order based on the public keys in the public key set corresponding to the intermediate client itself, to obtain the second encrypted data, comprises:
obtaining the service data of the intermediate client itself as current to-be-encrypted data, and determining the last client as a current candidate client;
encrypting the current to-be-encrypted data based on a public key of the current candidate client, to obtain current intermediate encrypted data;
in the specified order, taking a previous client of the current candidate client as the current candidate client and taking the current intermediate encrypted data as the current to-be-encrypted data, and returning to perform an operation of encrypting the current to-be-encrypted data based on the public key of the current candidate client to obtain the current intermediate encrypted data, until the current to-be-encrypted data is encrypted based on a public key of a next client of the intermediate client in the specified order to obtain the current intermediate encrypted data as the second encrypted data.

4. The method according to claim 1, wherein after sending the second to-be-processed data and the second encrypted data to the next client of the intermediate client in the specified order, the method further comprises:
obtaining response data sent by the last client; wherein, the response data comprises service data of each of the multiple clients and a response result corresponding to the service data of each of the multiple clients, and the response data is sent by the preset service platform to the last client;
determining a response result corresponding to the service data of the intermediate client itself from the response data.

5. The method according to claim 2, wherein before obtaining the first to-be-processed data sent by the previous client of the intermediate client in the specified order, the method further comprises:
generating public and private keys of the intermediate client itself, and sending the public key of the intermediate client itself to a client in the data privacy protection system that is located before the intermediate client in the specified order.

6. An electronic device, comprising:
a memory, configured for storing a computer program;
a processor, configured for carry out the method according to claim 1 when executing the program stored in the memory.

7. A non-transitory computer-readable storage medium having a computer program stored therein, wherein computer program, when executed by a processor, carries out the method according to claim 1.

8. A data privacy protection method based on multi-layer encryption, which is applied to an initial client of multiple clients comprised in a data privacy protection system; wherein the multiple clients are in a specified order, and the initial client is a first client in the specified order, the method comprises:
encrypting service data of the initial client itself based on a public key set corresponding to the initial client itself, to obtain first to-be-processed data; wherein a public key set corresponding to a client comprises a public key of a last client in the specified order;
sending the first to-be-processed data to a next client of the initial client in the specified order, so that the next client of the initial client in the specified order obtains second to-be-forwarded data based on the first to-be-processed data, encrypts service data of the next client itself based on the public key set corresponding to the next client itself to obtain second encrypted data, and sends the second to-be-forwarded data and the second encrypted data to a next client of the next client itself, such that the last client decrypts, after receiving the data, the received data based on a private key of the last client itself to obtain service data of each of other clients other than the last client itself, and sends the service data of each of other clients other than the last client itself and service data of the last client itself to a preset service platform; the data received by the last client comprises all data sent by a previous client of the last client.

9. The method according to claim 8, wherein the public key set corresponding to the client comprises public keys of all clients located after this client in the specified order;

the second to-be-forwarded data is obtained by the next client of the initial client decrypting the first to-be-processed data based on a private key of the next client itself;

encrypting the service data of the initial client itself based on the public key set corresponding to the initial client itself, to obtain the first to-be-processed data, comprises:

iteratively encrypting the service data of the initial client itself layer by layer in an encryption order based on public keys in the public key set corresponding to the initial client itself, to obtain the first to-be-processed data, wherein the encryption order is opposite to a specified order for clients corresponding to the public keys.

10. The method according to claim 9, wherein iteratively encrypting the service data of the initial client itself layer by layer in the encryption order based on the public keys in the public key set corresponding to the initial client itself, to obtain the first to-be-processed data, comprises:

obtaining the service data of the initial client itself as current to-be-encrypted data, and determining the last client as a current candidate client;

encrypting the current to-be-encrypted data based on a public key of the current candidate client, to obtain current intermediate encrypted data;

in the specified order, taking a previous client of the current candidate client as the current candidate client, and taking the current intermediate encrypted data as the current to-be-encrypted data, and returning to perform an operation of encrypting the current to-be-encrypted data based on the public key of the current candidate client to obtain the current intermediate encrypted data, until the current to-be-encrypted data is encrypted based on a public key of a next client of the initial client in the specified order to obtain the current intermediate encrypted data as the first to-be-processed data.

11. The method according to claim 8, wherein after sending the first to-be-processed data to the next client of the initial client in the specified order, the method further comprises:

obtaining response data sent by the last client; wherein, the response data comprises service data of each of the multiple clients and a response result corresponding to the service data of each of the multiple clients, and the response data is sent by the preset service platform to the last client;

determining a response result corresponding to the service data of the initial client itself from the response data.

12. An electronic device, comprising:
a memory, configured for storing a computer program;
a processor, configured for carry out the method according to claim 8 when executing the program stored in the memory.

13. A non-transitory computer-readable storage medium having a computer program stored therein, wherein computer program, when executed by a processor, carries out the method according to claim 8.

14. A data privacy protection method based on multi-layer encryption, which is applied to a final client of multiple clients comprised in a data privacy protection system; wherein the multiple clients are in a specified order, and the final client is a last client in the specified order, the method comprises:

obtaining second to-be-processed data and second encrypted data sent by a previous client of the final client in the specified order, wherein the second to-be-processed data is obtained based on first to-be-processed data received by the previous client of the final client from another client; the second encrypted data is obtained by the previous client of the final client encrypting service data of the previous client itself based on a public key set corresponding to the previous client itself; a public key set corresponding to a client comprises a public key of the final client;

decrypting the second to-be-processed data and the second encrypted data based on a private key of the final client itself, to obtain service data of each of other clients other than the final client itself;

sending the service data of each of other clients other than the final client itself and service data of the final client itself to a preset service platform.

15. The method according to claim 14, wherein the public key set corresponding to the client comprises public keys of all clients located after this client in the specified order;

the second to-be-processed data is obtained by the previous client of the final client decrypting the first to-be-processed data sent by another client based on a private key of the previous client itself;

the second encrypted data is obtained by the previous client of the final client iteratively encrypting the service data of the previous client itself layer by layer in an encryption order based on a public key set corresponding to the previous client itself;

wherein the encryption order is opposite to a specified order for clients corresponding to public keys.

16. The method according to claim 14, wherein sending the service data of each of other clients other than the final client itself and the service data of the final client itself to the preset service platform, comprises:

encrypting the service data of each of other clients other than the final client itself and the service data of the final client itself based on a preset key, to obtain third encrypted data;

sending the third encrypted data to the preset service platform.

17. The method according to claim 14, wherein after sending the service data of each of other clients other than the final client itself and the service data of the final client itself to the preset service platform, the method further comprises:

obtaining response data sent by the preset service platform; wherein the response data comprises service data of each of the multiple clients and a response result corresponding to the service data of each of the multiple clients;

sending the response data to other clients in the data privacy protection system.

18. The method according to claim 17, wherein before obtaining the second to-be-processed data and the second encrypted data sent by the previous client of the final client in the specified order, the method further comprises:

generating the public key and the private key of the final client itself, and sending the public key of the final client itself to other clients in the data privacy protection system.

19. An electronic device, comprising:
a memory, configured for storing a computer program;
a processor, configured for carry out the method according to claim 14 when executing the program stored in the memory.

20. A non-transitory computer-readable storage medium having a computer program stored therein, wherein computer program, when executed by a processor, carries out the method according to claim 14.

* * * * *